United States Patent
Sato et al.

(10) Patent No.: US 9,506,536 B2
(45) Date of Patent: Nov. 29, 2016

(54) RECORDING APPARATUS

(71) Applicant: SEIKO EPSON CORPORATION, Tokyo (JP)

(72) Inventors: Makoto Sato, Nagano (JP); Noriyuki Koyanagi, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/726,863

(22) Filed: Jun. 1, 2015

(65) Prior Publication Data

US 2015/0360479 A1  Dec. 17, 2015

(30) Foreign Application Priority Data

Jun. 13, 2014 (JP) ................................ 2014-122135

(51) Int. Cl.
*B41J 11/00* (2006.01)
*F16H 7/14* (2006.01)
*F16H 7/02* (2006.01)
*B41J 19/00* (2006.01)

(52) U.S. Cl.
CPC .............. *F16H 7/14* (2013.01); *B41J 19/005* (2013.01); *F16H 7/02* (2013.01)

(58) Field of Classification Search
CPC ....................................................... B41J 19/00
See application file for complete search history.

(56) References Cited

U.S. PATENT DOCUMENTS

| 7,758,460 B2* | 7/2010 | Osakabe | B41J 19/005 399/211 |
|---|---|---|---|
| 8,608,282 B2* | 12/2013 | Terada | B41J 19/202 347/37 |
| 2005/0243125 A1* | 11/2005 | Ishikawa | 347/37 |
| 2007/0052164 A1* | 3/2007 | Watase et al. | 271/265.01 |
| 2007/0151830 A1* | 7/2007 | Kawamata | 198/813 |
| 2013/0276561 A1* | 10/2013 | Shikama | 74/89.22 |

FOREIGN PATENT DOCUMENTS

JP  2006-198936 A  8/2006

OTHER PUBLICATIONS

"Thermal Expansion Coefficients for Some Common Materials" http://www.engineeringtoolbox.com/linear-expansion.coefficients-d_95.html; retrieved Dec. 21, 2015.*

* cited by examiner

*Primary Examiner* — Stephen Meier
*Assistant Examiner* — John P Zimmermann
(74) *Attorney, Agent, or Firm* — Global IP Counselors, LLP

(57) ABSTRACT

A recording apparatus includes an endless belt wound around a driving pulley and a driven pulley, a driven pulley holder which holds the driven pulley and is movably provided in the wound direction of the endless belt, a frame on which the driven pulley holder is provided, a first biasing portion for biasing the driven pulley holder to a direction away from the driving pulley, and a regulating portion for regulating a movement of a predetermined distance or longer of the driven pulley holder toward the driving pulley side, in which the regulating portion is movably provided in the wound direction of the endless belt with respect to the frame and is biased to the driven pulley holder side by a second biasing portion.

3 Claims, 9 Drawing Sheets

RECORDING APPARATUS

BACKGROUND

1. Technical Field

The present invention relates to a recording apparatus which performs recording on a medium.

2. Related Art

In recent years, in a recording apparatus such as an ink jet type printer, a small-sized recording apparatus which is capable of being carried to outdoor, that is, which is a mobile type, has been spread, in addition to a recording apparatus which is used as a stationary recording apparatus indoor. As to such a mobile type recording apparatus, much further miniaturization is required.

In addition, as to a printer, there is a so-called serial type printer which completes recording by alternately executing a paper transport operation of transporting paper in a predetermined quantity and a recording operation of moving a carriage including a recording head in a paper width direction to record.

Furthermore, as to the ink jet type printer, there are a printer of a type in which a carriage includes an ink cartridge and a printer of a type in which an ink cartridge is provided independently from a carriage and the ink cartridge and the carriage are connected by an ink tube. In both types of serial printers, recording is performed by the carriage reciprocating in a predetermined range.

In the serial type printer, as a configuration of moving the carriage including the recording head in a paper width direction, a configuration in which a driving pulley and a driven pulley which are driven by power of a driving source such as a motor are provided on a frame, an endless belt is put around both pulleys, and the power of the motor is transferred to the carriage through the endless belt to make the carriage reciprocate integrally with the endless belt, has been commonly used.

The driven pulley is biased to an outward direction of a moving region of the carriage and is configured so as to apply tension to the endless belt wound around the driving pulley and the driven pulley.

Since this tension generates shaft loss with respect to a rotating shaft of the driving pulley and the driven pulley, this tension becomes a driving load with respect to the driving source such as the motor.

By the way, a stopper for defining a movement limit position of the carriage is provided at an end part of the moving region of the carriage. This stopper is used, for example, for detecting a current position of the carriage. That is, since a driving current value of the motor increases when the carriage abuts with respect to the stopper, a control portion of the printer can thereby detect that the carriage is at the movement limit position.

On the other hand, in the mobile type small-sized printer as described above or the like, a small-sized motor is also used for driving the driving pulley for miniaturization. However, when the motor for driving the driving pulley is miniaturized, the rating of the motor also decreases, and thus the tension of the endless belt is unable to increase.

When the tension of the endless belt is small, the driven pulley is easily drawn toward the driving pulley side when the carriage abuts on the stopper. As a result, a looseness occurs in the endless belt. This looseness causes a problem such as tooth skipping between the driving pulley and the endless belt.

In doing so, in order to prevent the looseness of the endless belt by the driven pulley being drawn toward the driving pulley side, a recording apparatus including a stopper mechanism for regulating a predetermined movement or more of the driven pulley toward the driving pulley side, is disclosed in JP-A-2006-198936. The stopper mechanism is attached to the frame on which the driving pulley and the driven pulley are provided.

While the stopper mechanism in JP-A-2006-198936 can regulate the movement of the driven pulley toward the driving pulley side, the stopper mechanism is fixed with respect to the wound direction of the belt (a moving direction of the carriage). Since the qualities of material of the frame and the endless belt are usually different from each other, when the printer is placed in a high temperature environment, the amount of expansion of the frame becomes larger than the amount of expansion of the endless belt accompanying the difference of the linear expansion coefficient and thus, the stopper mechanism pushes the driven pulley to the outside of the moving region of the carriage. By doing so, the tension of the endless belt significantly increases and thus, there are some cases of exceeding a load allowed by the motor which is a driving source.

SUMMARY

An advantage of some aspects of the invention is to suppress an excess increase in tension of an endless belt in a recording apparatus including a configuration in which an endless belt is wound around a driving pulley and a driven pulley.

According to a first aspect of the invention, there is provided a recording apparatus including an endless belt wound around a driving pulley and a driven pulley, a driven pulley holder which holds the driven pulley and is movably provided in the wound direction of the endless belt, a frame on which the driven pulley holder is provided, a first biasing portion for biasing the driven pulley holder to a direction away from the driving pulley, and a regulating portion for regulating a movement of a predetermined distance or longer of the driven pulley holder toward the driving pulley side, in which the regulating portion is movably provided in the wound direction of the endless belt with respect to the frame and is biased to the driven pulley holder side by a second biasing portion.

According to the aspect, since the regulating portion is movably provided in the wound direction of the endless belt with respect to the frame and is biased to the driven pulley holder side by the second biasing portion, when the driven pulley holder abuts against the regulating portion, the regulating portion can be moved to the driving pulley side against an biasing force of the second biasing portion. Accordingly, it is possible to suppress an excess increase in tension of the endless belt when the driven pulley holder abuts against the regulating portion.

According to a second aspect of the invention, there is provided a recording apparatus in which a linear expansion coefficient of the frame is larger than a linear expansion coefficient of the endless belt in the first aspect.

When the linear expansion coefficient is large, the change in length per unit length accompanying a rise in temperature becomes large. In a case where the linear expansion coefficient of the frame is larger than the linear expansion coefficient of the endless belt, since the extension of a length direction of the frame (the wound direction of the endless belt) due to the change in temperature becomes larger than the extension of the endless belt when the temperature becomes high, the risk in which the regulating portion is moved to the driven pulley holder side due to the thermal expansion becomes high. That is, the risk in which the tension of the endless belt increases becomes high.

However, it is possible to reduce the risk of an excess increase in tension of the endless belt, caused by the expansion of the frame under a high temperature condition by an action effect of the first aspect.

According to a third aspect of the invention, there is provided a recording apparatus including a carriage including a recording head of performing recording on a medium and reciprocating in a predetermined direction in the first aspect and the second aspect, in which the carriage is configured so as to be pulled by the endless belt by rotation of the driving pulley and be moved.

According to the aspect, in the recording apparatus including a carriage driving mechanism by the endless belt, it is possible to obtain the same effect as that of the first aspect and the second aspect.

According to a fourth aspect of the invention, there is provided a recording apparatus in which the regulating portion is movable in the wound direction of the endless belt by being biased by the second biasing portion and includes a slide portion which comes into contact with the driven pulley holder when regulating a movement of the driven pulley holder and a fixing portion for regulating a movement of a predetermined distance or longer of the slide portion toward the driving pulley side in any one of the first aspect to the third aspect.

According to a fifth aspect of the invention, there is provided a recording apparatus in which the second biasing portion is arranged on the driving pulley side with respect to the driven pulley holder and is a coil spring which presses the regulating portion toward the driven pulley side in the fourth aspect.

According to the aspect, it is possible to realize a configuration of biasing the slide portion in the regulating portion to the driven pulley holder side in a space-saving manner.

BRIEF DESCRIPTION OF THE DRAWINGS

The invention will be described with reference to the accompanying drawings, wherein like numbers reference like elements.

FIG. 6A is a view viewed from a diagonally left forward side, and FIG. 6B is a view viewed from a diagonally right forward side.

FIG. 7A is a view viewed from a front face upper side, and FIG. 7B is a cross-section view taken along the line VIIB-VIIB in FIG. 7A.

FIG. 8A is a view viewed from a front face side, and FIG. 8B is a view viewed from a back face side.

DESCRIPTION OF EXEMPLARY EMBODIMENTS

Hereinafter, a recording apparatus according to an embodiment of the invention will be described with reference to attached drawings. Meanwhile, the invention is not limited thereto.

Example 1

As an example of the recording apparatus of the embodiment, an ink jet type printer will be given as an example.

Figure 1:
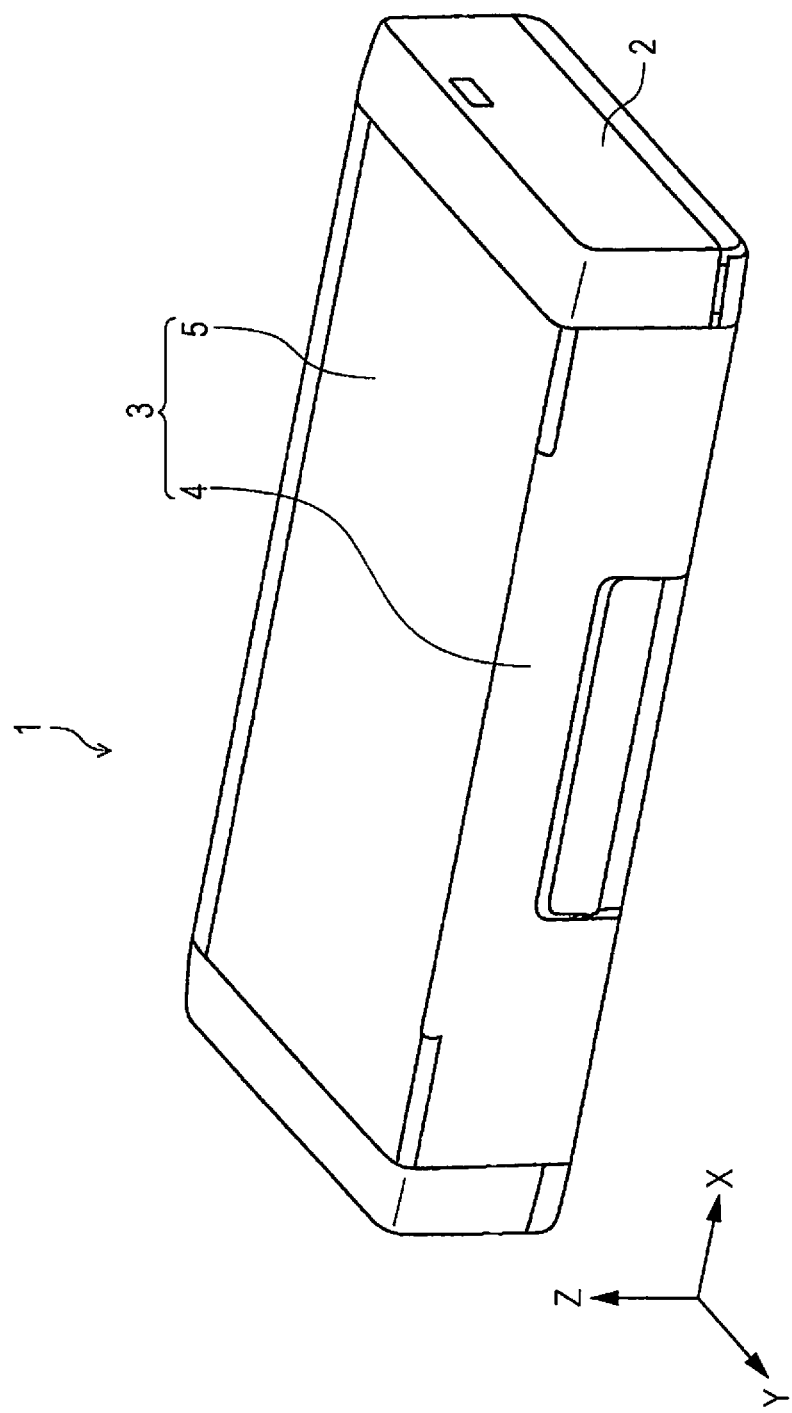
FIG. 1 is a perspective view illustrating an appearance in a state in which a cover is closed in a printer according to an embodiment of the invention.
Figure 2:
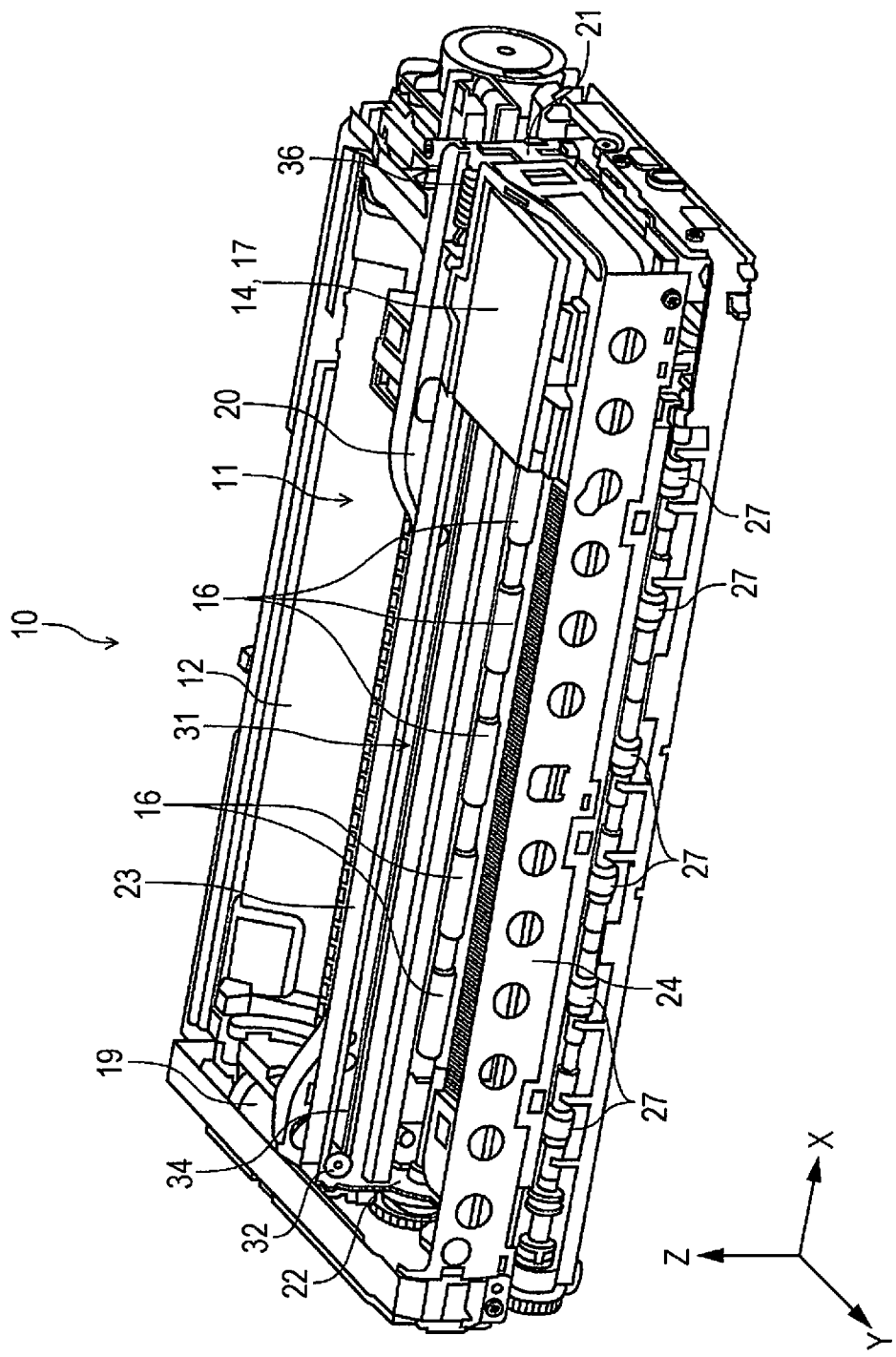
FIG. 2 is a perspective view illustrating an apparatus body in the printer according to an embodiment of the invention.
Figure 3:
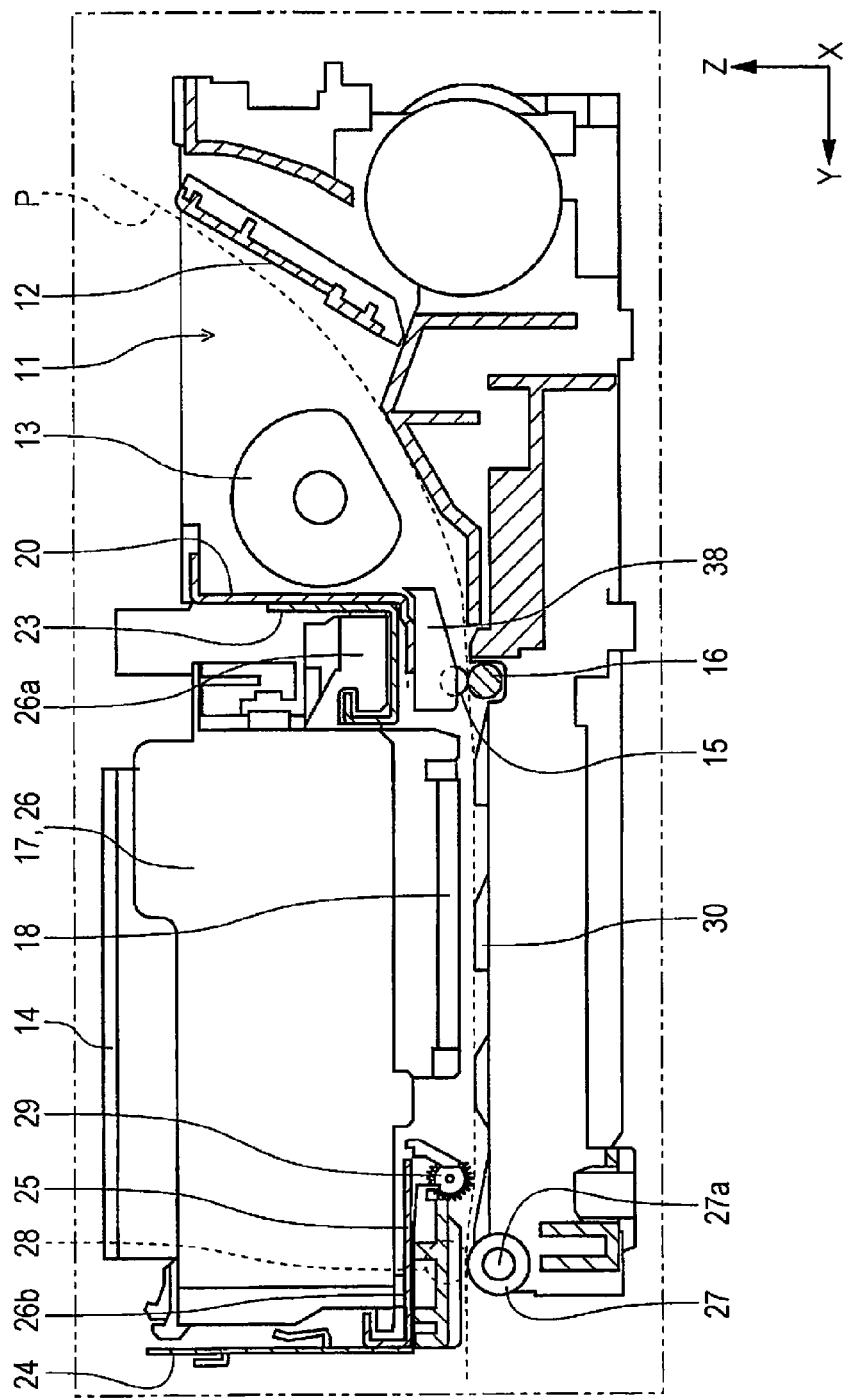
FIG. 3 is a side cross-section view illustrating a medium transporting route of the printer according to an embodiment of the invention.
Figure 4:
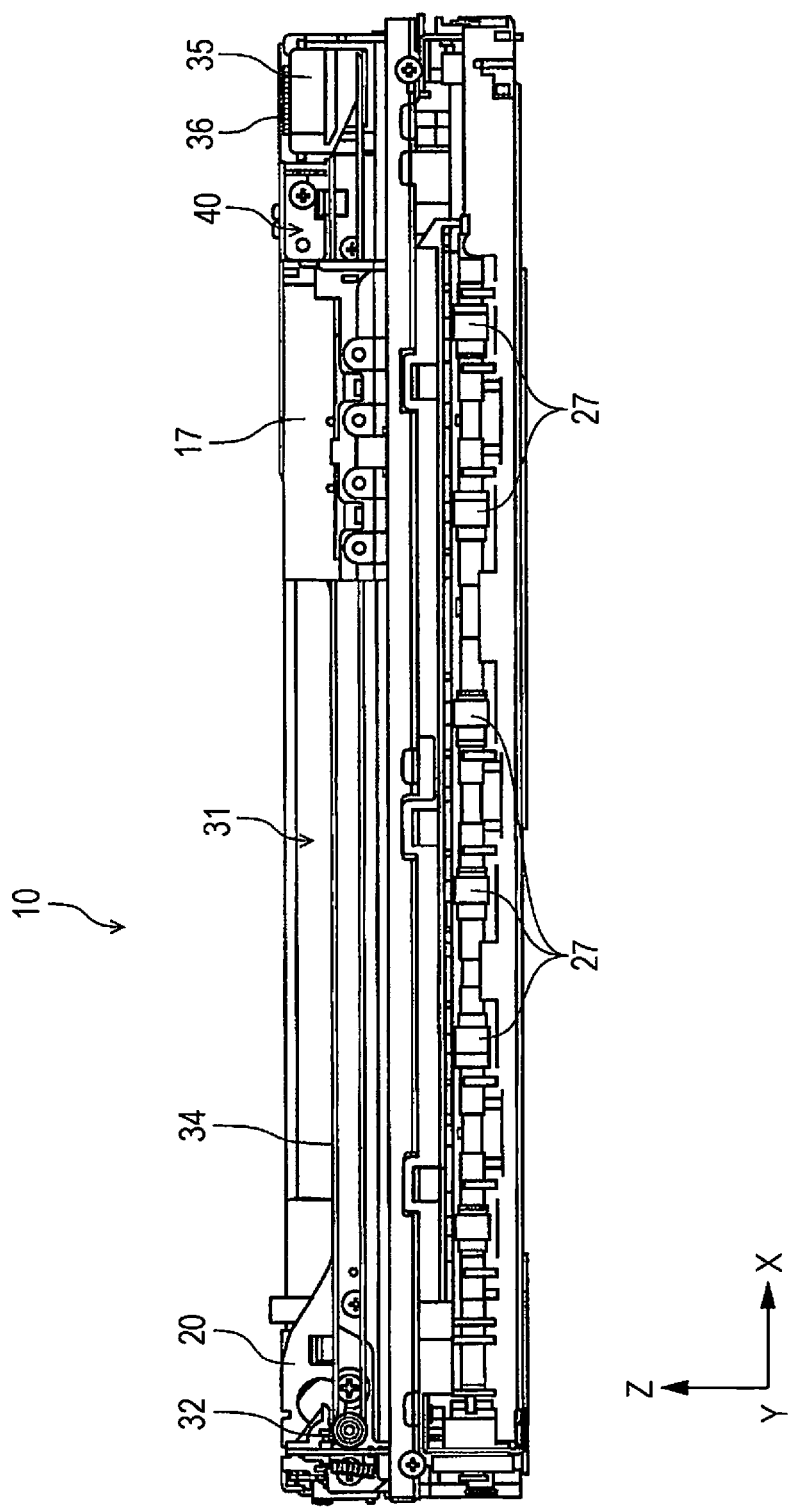
FIG. 4 is a front view of a carriage driving mechanism.
Figure 5:
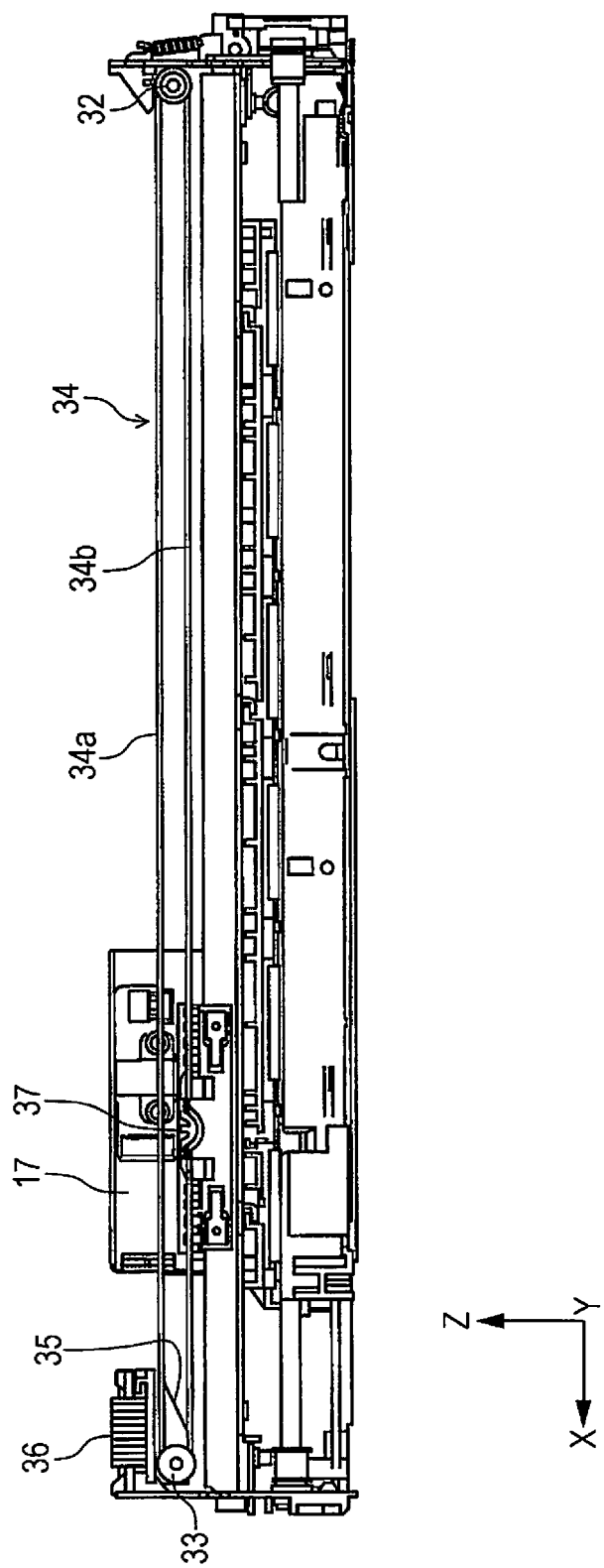
FIG. 5 is a back view of the carriage driving mechanism.

FIG. 1 is a perspective view illustrating an appearance in a state in which a cover is closed in a printer according to an embodiment of the invention. FIG. 2 is a perspective view illustrating an apparatus body in the printer according to an embodiment of the invention. FIG. 3 is a side cross-section view illustrating a medium transporting route of the printer according to an embodiment of the invention. FIG. 4 is a front view of a carriage driving mechanism. FIG. 5 is a back view of the carriage driving mechanism.

Figure 6A:
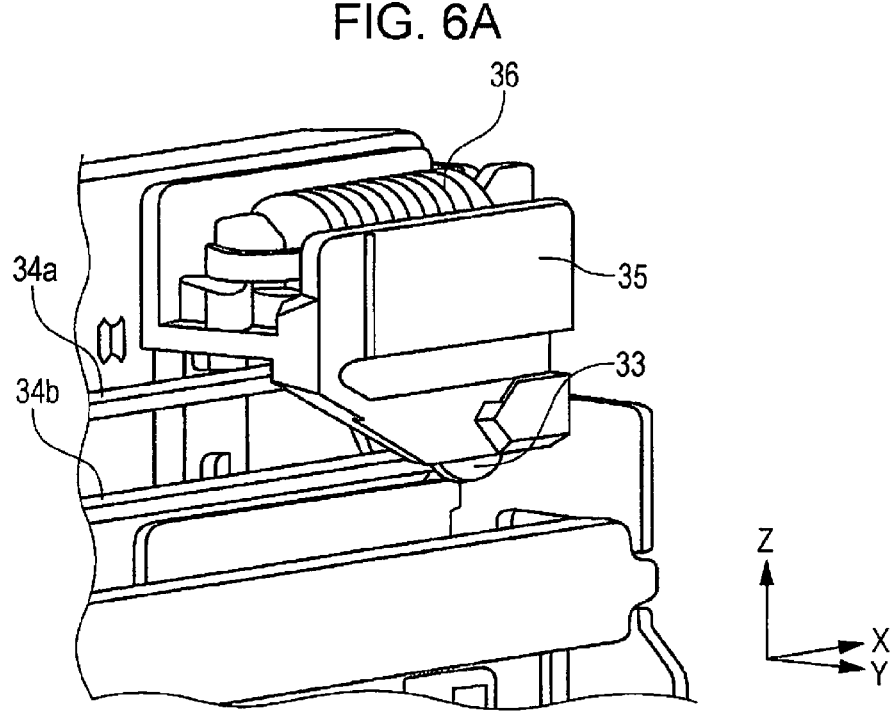
FIGS. 6A and 6B are enlarged perspective views of a driven pulley holder.
Figure 6B:
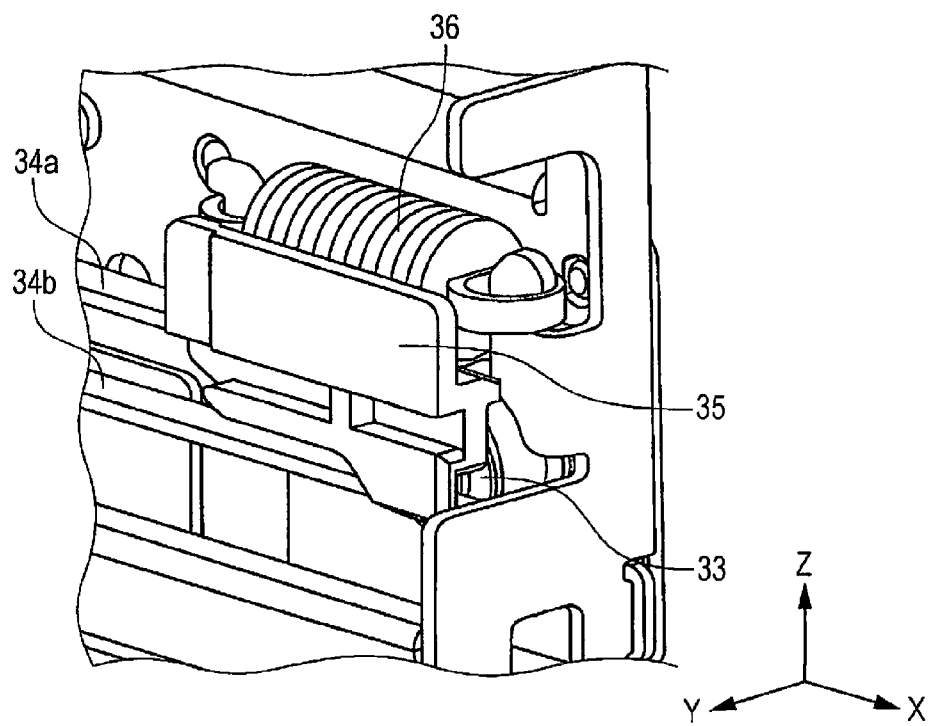
Figure 7A:
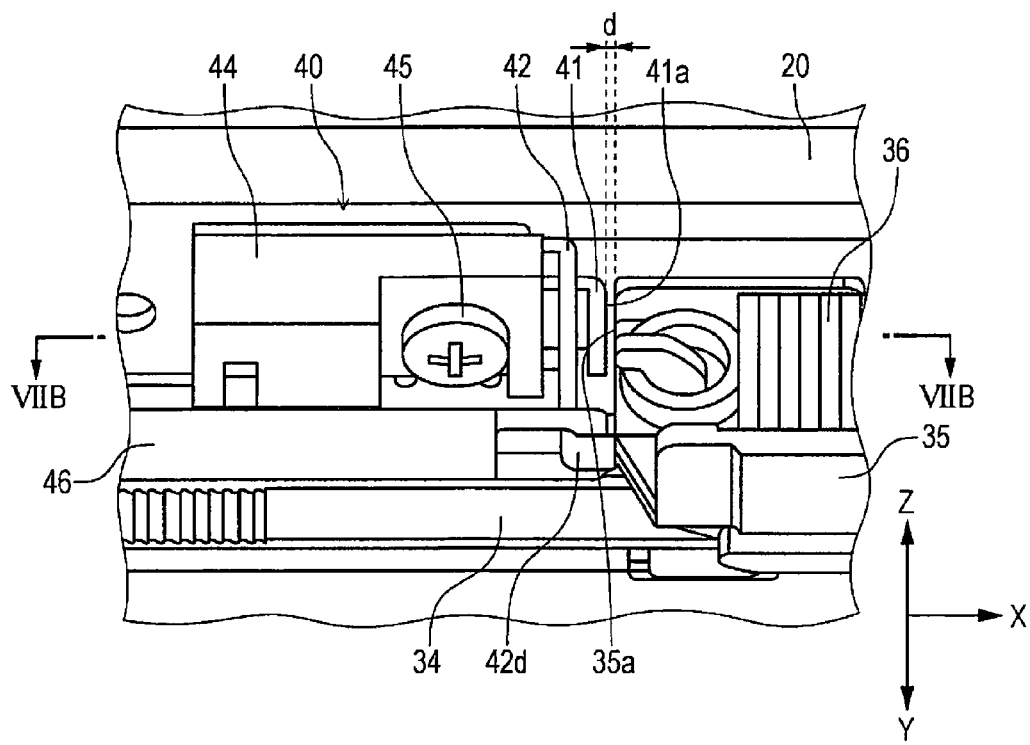
FIGS. 7A and 7B are enlarged perspective views of a regulating portion.
Figure 7B:
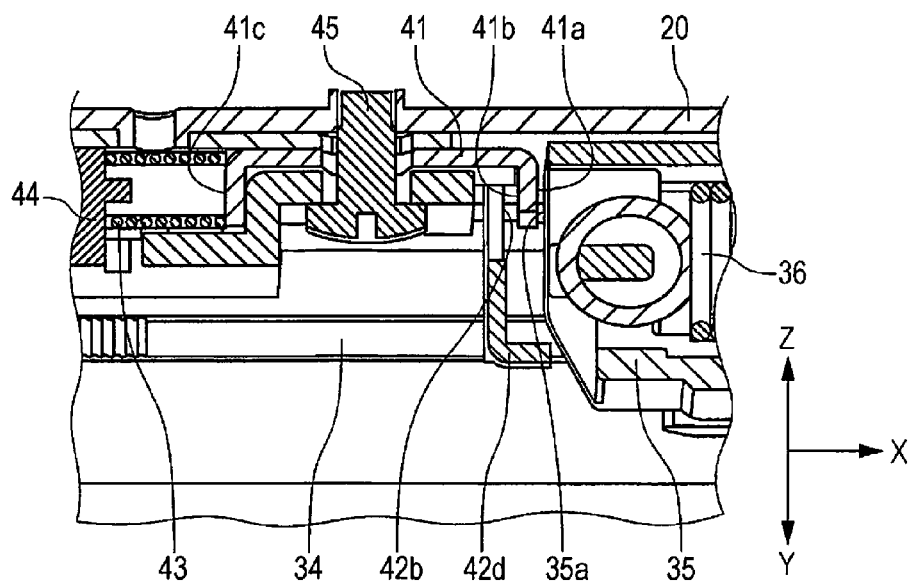
Figure 8A:
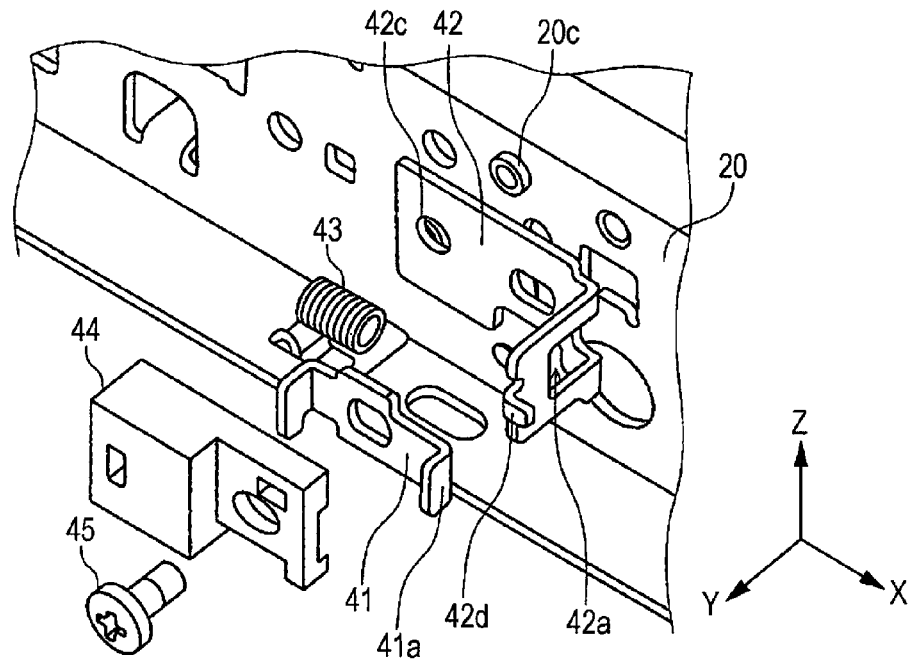
FIGS. 8A and 8B are exploded perspective views of the regulating portion.
Figure 8B:
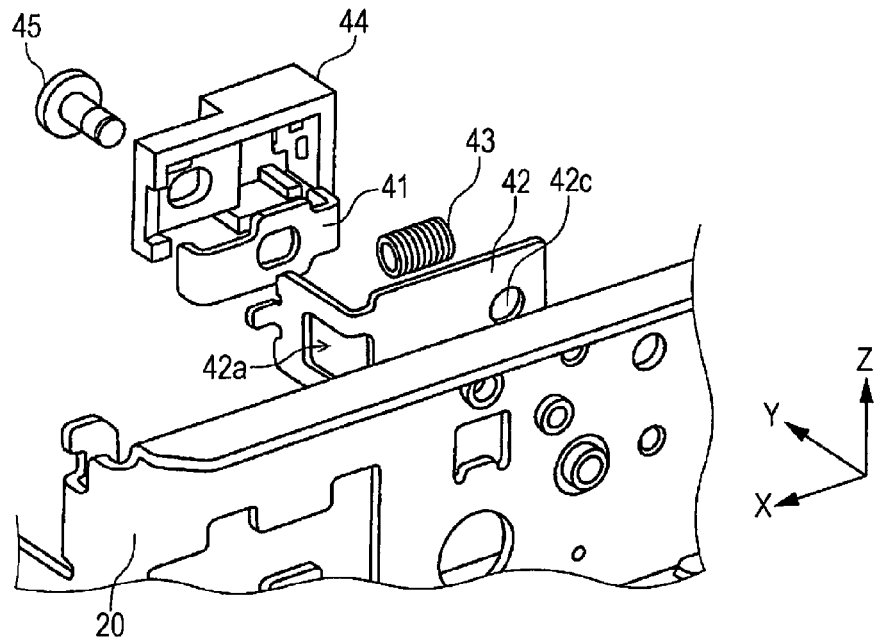
Figure 9:
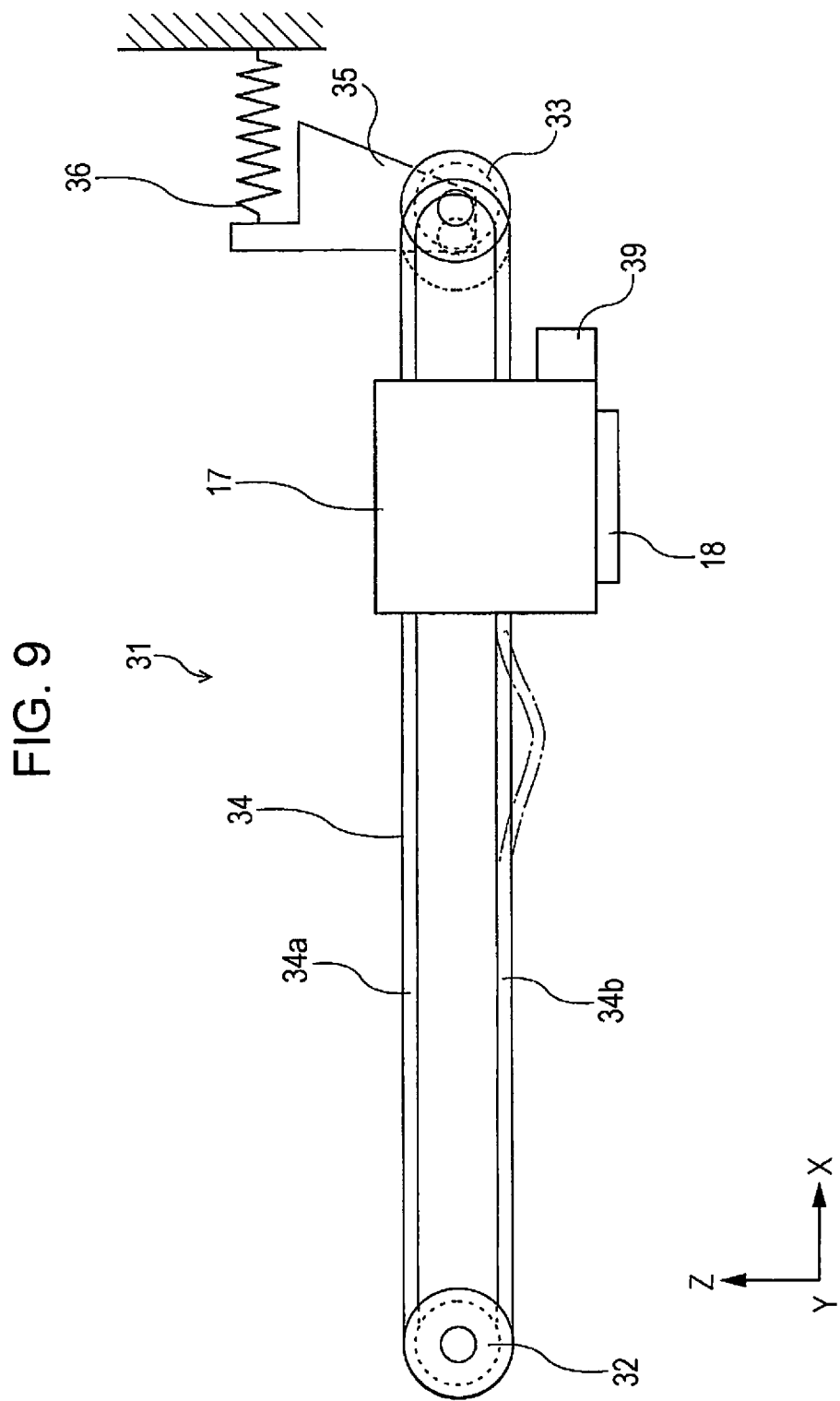
FIG. 9 is a schematic view of the carriage driving mechanism.

FIGS. 6A and 6B are enlarged perspective views of a driven pulley holder, FIG. 6A is a view viewed from a diagonally left forward side, and FIG. 6B is a view viewed from a diagonally right forward side. FIGS. 7A and 7B are enlarged perspective views of a regulating portion, FIG. 7A is a view viewed from a front face upper side, and FIG. 7B is a cross-section view taken along the line VIIB-VIIB in FIG. 7A. FIGS. 8A and 8B are exploded perspective views of the regulating portion, FIG. 8A is a view viewed from a front face side, and FIG. 8B is a view viewed from a back face side. FIG. 9 is a schematic view of the carriage driving mechanism.

In addition, in an X-Y-Z coordinate system shown in each figure, an X direction is a scanning direction of the recording head and a Y direction is a depth direction of the recording apparatus. A Z direction is a gravity direction and indicates a height direction of the apparatus. Meanwhile, in each figure, a +Y direction is set to the front face side of the apparatus and a −Y direction side is set to the back face side of the apparatus. In addition, a +Z direction is set to the upper face side of the apparatus and a −Z direction side is set to the lower face side of the apparatus.

Firstly, an outline of an ink jet type printer 1 (hereinafter, referred to as a printer 1) according to an embodiment of the invention will be described based on FIG. 1 to FIG. 3.

The printer 1 shown in FIG. 1 includes an apparatus body 10 shown in FIG. 2 in its inside and an appearance of the printer 1 is configured with a housing 2 covering the periphery of the apparatus body 10 and a cover portion 3 that is openable and closable with respect to the apparatus body 10.

The cover portion 3 is configured by integrally forming a front face cover portion 4 and an upper face cover portion 5, and an operation panel (not shown) and a paper feeding port (not shown) appear provided on the upper side of the apparatus body 10 and a paper delivery port (not shown) appears on the front face side when the cover portion 3 opens.

Next, an internal structure of the printer 1, that is, an outline of the apparatus body 10 will be described using FIG. 2 and FIG. 3. Meanwhile, in FIG. 3, a transporting route (dashed line) of a recording medium (for example, a recording paper of a cut-form, hereinafter, referred to as a paper P) is shown.

The printer 1 has a configuration in which the paper P as a medium is transported in a +Y direction in FIG. 3. Meanwhile, hereinafter, in the printer 1, there are some cases where a direction in which the medium is transported is referred to as a "downstream" and a direction opposite thereto is referred to as an "upstream".

As to the apparatus body 10, a skeleton thereof is configured with a plurality of frames. Specifically, the skeleton is configured with a main frame 20, a side frame 21, a side frame 22, a guide frame 23, a sub frame 24, and a guide frame 25. Each frame will be described below in detail.

A feeding port 11 in which the paper P can be set is provided on the back face side of the apparatus of the apparatus body 10, and a plurality of papers P are inserted from the feeding port 11, are loaded in a hopper 12, and are supported in an inclined posture.

The hopper 12 is oscillatably provided so that the mounting face of the paper P advances and retreats with respect to a feed roller 13 and is biased to the feed roller 13 side by an biasing means (not shown). As to a plurality of papers P which are set to the hopper 12, the uppermost paper P comes into contact with the feed roller 13, and the papers P are picked up by a unit number by rotation of the feed roller 13 and are fed toward downstream in a transporting direction.

The paper P which is sent from the upstream side in a transporting direction is transported to a recording position below an ink jet recording head 18 (hereinafter, a recording head 18) by a paper transporting means including a transporting driving roller 16 and a transporting driven roller 15.

The recording head 18 is provided in a carriage 17. The carriage 17 mounts an ink cartridge 14 for supplying ink to the recording head 18, receives power from a motor 19 (FIG. 2), and reciprocates in a direction intersecting a transporting direction (a +Y direction) of the paper P, that is, in a paper width direction (an X axis direction). Meanwhile, in the embodiment, in the moving region (moving range) of the carriage 17, the right end in FIG. 2 is a home position of the carriage 17. Here, the home position means a standby position of the carriage 17 when the printing is not carried out or when a power supply is off.

A platen 30 for defining a gap between a liquid discharge face of the recording head 18 and the paper P is provided opposite to the recording head 18, below the recording head 18. Recording is executed by discharging the ink from the recording head 18 to the medium such as the paper P between the recording head 18 and the platen 30.

A paper delivering means including a delivering driving roller 27 and a delivering driven roller 28 provided at the downstream side in a transporting direction of the recording head 18. The paper P after recording is delivered from the paper delivery port (not shown) formed on the front face of the apparatus toward the front of the apparatus by the paper delivering means. Meanwhile, a sign 27a is a rotating shaft of the delivering driving roller 27 and a plurality of delivering driving rollers 27 are provided along an axial direction of the rotating shaft 27a at an appropriate interval (refer to FIG. 2). In addition, a sign 29 is a regulating roller for regulating the lift of the paper.

Next, the frame configuring the skeleton of the apparatus body 10 described above will be described. The main frame 20, the sub frame 24, the guide frame 23, and the guide frame 25 shown in FIG. 2 or FIG. 3 have a shape extending in a paper width direction (an X axis direction) and the side frame 21 and the side frame 22 has a shape extending in a paper transporting direction (a Y axis direction).

The main frame 20 extends in a vertical direction (a Z axis direction) in a cross sectional view as shown in FIG. 3 and an upper part thereof has a shape bent to the rear side of the apparatus into an L shape and a lower part thereof has a shape bent to the forward side of the apparatus into an L shape. The motor 19 relating to a driving mechanism of the carriage 17 described later is attached to the main frame 20. In addition, various kinds of constituent members such as a roller support member 38 for supporting the transporting driven roller 15 are assembled to the main frame 20, in addition a paper feeding means including the hopper 12 and the feed roller 13.

The guide frame 23 and the guide frame 25 are frames for supporting the carriage 17 and are provided at positions interposing the carriage 17 in a Y axis direction. On the guide frame 23 and the guide frame 25, sliding portions 26a and 26b provided in a carriage body 26 are respectively supported by the guide frame 23 and the guide frame 25. Meanwhile, it is possible to use a grease for reducing sliding resistance on sliding faces of the guide frame 23 and the guide frame 25 on which the sliding portions 26a and 26b in the carriage body 26 slide.

In addition, the side frame 21 and the side frame 22 (refer to FIG. 2) are respectively bonded with the end parts of the guide frame 23 and the guide frame 25 and various kinds of elements configuring the paper transporting route such as the transporting driving roller 16 or the delivering driving roller 27 shown in FIG. 3 are assembled thereto.

Next, the driving mechanism of the carriage 17 will be described based on FIG. 4 to FIG. 6 and FIG. 9.

As described above, the carriage 17 is supported by the guide frame 23 and the guide frame 25. In addition, the guide frame 23 is provided with a carriage driving mechanism 31 which is supplied with the driving force from the motor 19 and makes the carriage 17 move in an X axis direction. The carriage driving mechanism 31 includes a driving pulley 32, a driven pulley 33 (refer to FIG. 6), and an endless belt 34 wound around the driving pulley 32 and the driven pulley 33.

The driving pulley 32 is attached to a driving shaft of the motor 19 and is rotationally driven by the motor 19. The motor 19 including the driving pulley 32 is attached to one end side of the moving region of the carriage 17.

The driven pulley 33 is provided at a position away from the driving pulley 32 to the X axis direction side in FIG. 4. That is, the driven pulley 33 is provided on the other end side of the moving region of the carriage 17. In addition, the driven pulley 33 is configured to be rotatably driven with respect to the rotation of the driving pulley 32.

In addition, as shown in FIG. 6A and FIG. 6B, the driven pulley 33 is rotatably attached to and held in a driven pulley holder 35. The driven pulley holder 35 is attached to the main frame 20 and is movably provided in the wound direction of the endless belt 34, that is, in an X axis direction.

Moreover, the driven pulley holder 35 is biased to the direction away from the driving pulley 32, that is, the +X axis direction side by a spring member 36 as the first biasing portion and is configured so as to apply the tension to the endless belt 34 wound around the driving pulley 32 and the driven pulley 33.

Meanwhile, in the driving pulley 32 and the driven pulley 33, a plurality of teeth (not shown) are provided on an outer peripheral face thereof. Moreover, teeth (not shown) which are meshed with the teeth of the driving pulley 32 and the teeth of the driven pulley 33 are provided on the inner peripheral face side of the endless belt 34.

In addition, the endless belt 34 wound around the driving pulley 32 and the driven pulley 33 includes a first route 34a extending in the wound direction of the belt (an X axis direction) on the upper side (the +Z axis direction side) in a height direction of the apparatus (a Z axis direction) and a second route 34b extending in the same direction on the lower side (the −Z axis direction side), that is, opposite to the first route 34a.

In the carriage 17, a part of the second route 34b of the endless belt 34 is gripped by a gripping portion 37 (refer to FIG. 5) provided on the back face side of the carriage 17. When the motor 19 makes the driving pulley 32 rotate, the carriage 17 is pulled by the endless belt 34 and slides on the guide frame 23 and the guide frame 25 in an X axis direction. Accordingly, the carriage 17 is moved in a +X axis direction or in a −X axis direction.

Here, as described above, the driven pulley 33 applies the tension to the endless belt by the driven pulley holder 35 being biased to a direction away from the driving pulley 32 by the spring member 36. When this tension is as small as possible, it is possible to make the driving load of the motor 19, which is a driving source of the driving pulley 32, smaller, and thus, since it is possible to use the motor 19 having a small rating, it is preferable from the viewpoint of miniaturization of the apparatus.

However, when the tension is small, as shown in FIG. 9, when the carriage 17 abuts on the carriage stopper 39 of the home position side, the driven pulley 33 is drawn toward the driving pulley 32 side by the tension given by the driving pulley 32 to the endless belt 34 and the looseness is caused in the second route 34b of the endless belt 34. This looseness causes tooth skipping between the driving pulley 32 and the endless belt 34.

In addition, the endless belt 34 is loosened, the endless belt 34 comes into contact with the sliding face of the carriage of the guide frame 23 positioned below the endless belt 34 and thus there is a risk in which the grease is adhered to endless belt 34.

Even if a tooth skipping preventing member for preventing the tooth skipping phenomenon is provided, there is a risk in which the endless belt 34 is further loosened when the driven pulley 33 is continuously drawn. In this case, a problem of the adhesion of the grease to the endless belt 34 also occurs.

Therefore, the carriage driving mechanism 31 according to the embodiment includes a regulating portion 40 for regulating a movement of a predetermined distance or longer of the driven pulley holder 35 toward the driving pulley 32 side.

The regulating portion 40 will be described based on FIG. 7A and FIG. 8B.

The regulating portion 40 is biased to a +X axis direction (the driven pulley holder 35 side) by the coil spring 43 as the second biasing portion and is movable in an X axis direction (the wound direction of the endless belt 34), and includes a slide portion 41 which comes into contact with the driven pulley holder 35 when regulating the movement of the driven pulley holder 35 and a fixing portion 42 for regulating the movement of a predetermined distance or more of the slide portion 41 to the driving pulley 32 side.

The fixing portion 42 is positioned by a hole 42c being fitted to a projection portion 20c of the main frame 20 side as shown in FIG. 8A and is attached to the main frame 20 by a screw 45. Meanwhile, a sign 42 is a holding portion of a scale 46 (refer to FIG. 7A).

In addition, the slide portion 41 is provided by being inserted into the hole 42a provided on the fixing portion 42, is provided so as to slidingly move in an X axis direction, and is arranged by being provided with a clearance d (FIG. 7A) allowing the movement of the driven pulley holder 35 in a state of being biased to a +X axis direction by the coil spring 43. Moreover, when the driven pulley holder 35 is drawn to the driving pulley 32 side by the tension of the endless belt 34, the slide portion 41 is configured so that an end portion 41a in the +X side of the slide portion 41 comes into contact with an end portion 35a in the −X side of the driven pulley holder 35.

In addition, the slide portion 41 comes into contact with a contact face 42b of the fixing portion 42 side on the opposite face side of the end portion 41a and is configured so that the slide portion 41 itself is not moved to the driving pulley 32 side (a −X axis direction) by a predetermined distance or longer.

The driven pulley 33 provided in the driven pulley holder 35 approaches the driving pulley 32 side by a predetermined distance or longer and prevents the endless belt 34 from loosening by the regulating portion 40 thus formed and it is possible to reduce the risk in which the endless belt 34 comes into contact with the sliding face of the carriage of the guide frame 23 positioned below the endless belt 34 and the grease is adhered thereto.

In addition, the coil spring 43 is arranged on the driving pulley 32 side with respect to the driven pulley holder 35, is provided between the slide portion 41 and the spring holding portion 44, and presses the slide portion 41 to the driven pulley 33 side (a +X axis direction). More specifically, one end side of the coil spring 43 comes into contact with the rear side (the −X direction side) in an biasing direction (a +X axis direction) of the slide portion 41 and furthermore, the other end of the coil spring 43 is provided so as to come into contact with the spring holding portion 44 in the rearward.

The spring holding portion 44, the slide portion 41, and the fixing portion 42 are integrally attached to the main frame 20 by the screw 45.

By this configuration, it is possible to realize a configuration in which the slide portion 41 is biased to the +X axis direction side, that is, the driven pulley holder 35 side in a space-saving manner.

In the carriage driving mechanism 31 of a recording apparatus 1 according to the invention, the following action effect is obtained by the regulating portion 40 which is movable in the wound direction of the endless belt with respect to the main frame 20 being provided by being biased to the driven pulley holder 35 side.

A metal material is usually used for a material for forming a frame such as the main frame 20. For example, in the embodiment, the frame is formed by an aluminum material for weight reduction.

The metal material is thermally expanded when the temperature becomes high and an expansion of a long-shaped member such as the main frame 20 significantly appears in a longitudinal direction thereof, that is, in an X axis direction. Therefore, in a case where the recording apparatus 1 is placed under a high temperature condition, there is a risk in which the regulating portion 40 approaches the driven pulley holder 35 side by the thermal expansion of the main frame 20 and furthermore, comes into contact with the driven pulley holder 35 to push the driven pulley holder 35 to a +X axis direction. When the driven pulley holder 35 is pushed to the +X axis direction side, the tension of the endless belt 34 increases.

Here, in the regulating portion 40, since the slide portion 41 is biased to the driven pulley holder 35 side by the coil spring 43, when the driven pulley holder 35 abuts against the regulating portion 40 (the slide portion 41), the slide portion 41 of the regulating portion 40 can be moved to the driving pulley 32 side against an biasing force of the coil spring 43.

Accordingly, it is possible to suppress an excess increase in tension of the endless belt 34 when the driven pulley holder 35 abuts against the regulating portion 40. Therefore, it is possible to reduce the risk of exceeding an allowable lateral pressure of the motor 19 driving the driving pulley 32.

As described above, while the metal material is usually used for a material for forming a frame such as the main frame 20, since the endless belt 34 is configured to apply the tension, a material in which an extension due to pulling or an expansion due to temperature hardly occur, is used as a material thereof. For example, an ABS resin reinforced by adding a glass fiber is generally used. Here, the linear expansion coefficient of the metal material such as aluminum for forming the frame is larger than the linear expansion coefficient of a glass fiber-reinforced ABS resin used for a belt.

When the linear expansion coefficient is large, the change in length per unit length accompanying a rise in temperature becomes large. In a case where the linear expansion coefficient of the main frame 20 on which the driven pulley holder 35 is provided is larger than the linear expansion coefficient of the endless belt 34, since the extension of an X axis direction (the wound direction of the endless belt 34) of the main frame 20 due to the change in temperature becomes larger than the extension of the endless belt 34 when the temperature becomes high, the risk in which the regulating portion 40 comes into contact with the driven pulley holder 35 due to the thermal expansion and furthermore, pushes the driven pulley holder 35 to a direction away from the driving pulley 32, increases. That is, the risk in which the tension of the endless belt 34 increases becomes high.

However, it is possible to effectively reduce the risk of an excess increase in tension of the endless belt, caused by the expansion of the main frame 20 under a high temperature condition by the action effect based on an inclusion of the regulating portion 40 described above.

Meanwhile, the second biasing portion for biasing the slide portion to a +X axis direction is not limited to a configuration in which the coil spring 43 is used and other elastic members can be used. For example, the second biasing portion can be also configured by using a tension spring between the slide portion 41 and the fixing portion 42.

In this case, since it is possible to configure without the spring holding portion 44, it is possible to reduce the number of components configuring the regulating portion 40.

The invention is not limited to the embodiments described above, various modifications can be carried out within the scope of the invention described in aspects, and it goes without saying that these are also included within the scope of the invention.

The entire discovery of Japanese Patent Application No. :2014-122135, filed Jun. 13, 2014 is expressly incorporated by reference herein.

What is claimed is:

1. A recording apparatus comprising:
   an endless belt wound around a driving pulley and a driven pulley;
   a carriage including a recording head of performing recording on a medium and reciprocating in a predetermined direction by being pulled by the endless belt by rotation of the driving pulley;
   a driven pulley holder which holds the driven pulley and is movably provided in the predetermined direction;
   a frame on which the driven pulley holder is provided;
   a first biasing portion for biasing the driven pulley holder to a direction from the driving pulley toward the driven pulley among the predetermined directions; and
   a regulating portion for regulating a movement of a predetermined distance or longer of the driven pulley holder toward the driving pulley side,
   wherein the regulating portion is movably provided in the predetermined direction with respect to the frame and is biased to the driven pulley holder side by a second biasing portion, and
   the regulating portion includes
      a slide portion which comes into contact with the driven pulley holder when regulating a movement of the driven pulley holder, and
      a fixing portion for regulating a movement of a predetermined distance or longer of the slide portion toward the driving pulley side.

2. The recording apparatus according to claim 1, wherein a linear expansion coefficient of the frame is larger than a linear expansion coefficient of the endless belt.

3. The recording apparatus according to claim 2, wherein the second biasing portion is arranged on the driving pulley side with respect to the driven pulley holder and is a coil spring which presses the regulating portion toward the driven pulley side.

* * * * *